US010914202B2

(12) United States Patent
Couzzicarneiro et al.

(10) Patent No.: US 10,914,202 B2
(45) Date of Patent: Feb. 9, 2021

(54) COMBINED CYCLE POWER PLANT AND METHOD FOR OPERATING SUCH A COMBINED CYCLE POWER PLANT

(71) Applicant: General Electric Technology GmbH, Baden (CH)

(72) Inventors: Mariah Couzzicarneiro, Baden (CH); Joerg Dietzmann, Baden (CH)

(73) Assignee: General Electric Technology GmbH, Baden (CH)

( * ) Notice: Subject to any disclaimer, the term of this patent is extended or adjusted under 35 U.S.C. 154(b) by 343 days.

(21) Appl. No.: 15/462,149

(22) Filed: Mar. 17, 2017

(65) Prior Publication Data
US 2017/0268384 A1 Sep. 21, 2017

(30) Foreign Application Priority Data

Mar. 18, 2016 (EP) ..................................... 16161150

(51) Int. Cl.
*F01K 23/10* (2006.01)
*F01K 17/02* (2006.01)
(Continued)

(52) U.S. Cl.
CPC ............ *F01K 23/106* (2013.01); *F01D 15/10* (2013.01); *F01K 7/16* (2013.01); *F01K 17/025* (2013.01);
(Continued)

(58) Field of Classification Search
CPC .......... F01K 23/106; F01K 23/10; F01K 7/26; F01K 17/025; Y02E 20/16; F05D 2220/72
See application file for complete search history.

(56) References Cited

U.S. PATENT DOCUMENTS 6,889,506 B2\* 5/2005 Grewe .................. F01K 23/068
60/39.094
9,581,328 B2\* 2/2017 Schroeder ............... F22D 1/003
(Continued)

FOREIGN PATENT DOCUMENTS

FR 1266810 A 7/1961

OTHER PUBLICATIONS

European Search Report for EP 16161150.4, dated Sep. 30, 2016, 7 pages.

*Primary Examiner* — Todd E Manahan
*Assistant Examiner* — Thuyhang N Nguyen
(74) *Attorney, Agent, or Firm* — Charlotte C. Wilson; James W. Pemrick

(57) ABSTRACT

A water/steam system for a combined cycle power plant and related method for operating said system are provided. The system comprises a heat recovery steam generator providing a flue gas stream path for extracting heat from a flue gas stream exhausted from a gas turbine, the heat recovery steam generator having a low pressure section including a low pressure evaporator arranged along the flue gas stream path for generating low pressure steam at a low pressure input level for a main input of a low pressure steam turbine. To use heat at low temperatures, the low pressure section may include a sub low pressure subsection with a sub low pressure evaporator for generating sub low pressure steam, at a sub low pressure level below the low pressure input level. The sub low pressure evaporator is disposed in the flue gas stream path downstream of a low pressure economizer.

20 Claims, 1 Drawing Sheet

(51) Int. Cl.
*F01D 15/10* (2006.01)
*F01K 7/16* (2006.01)
*F02C 3/04* (2006.01)
*H02K 7/18* (2006.01)

(52) U.S. Cl.
CPC ............... *F01K 23/10* (2013.01); *F02C 3/04* (2013.01); *H02K 7/1823* (2013.01); *F05D 2220/32* (2013.01); *F05D 2220/62* (2013.01)

(56) References Cited

U.S. PATENT DOCUMENTS

| | | | |
|---|---|---|---|
| 2003/0233830 A1* | 12/2003 | Marin | F01K 21/042 60/649 |
| 2014/0096535 A1* | 4/2014 | Esakki | F01K 13/02 60/783 |
| 2015/0052906 A1 | 2/2015 | Kehmna et al. | |

\* cited by examiner

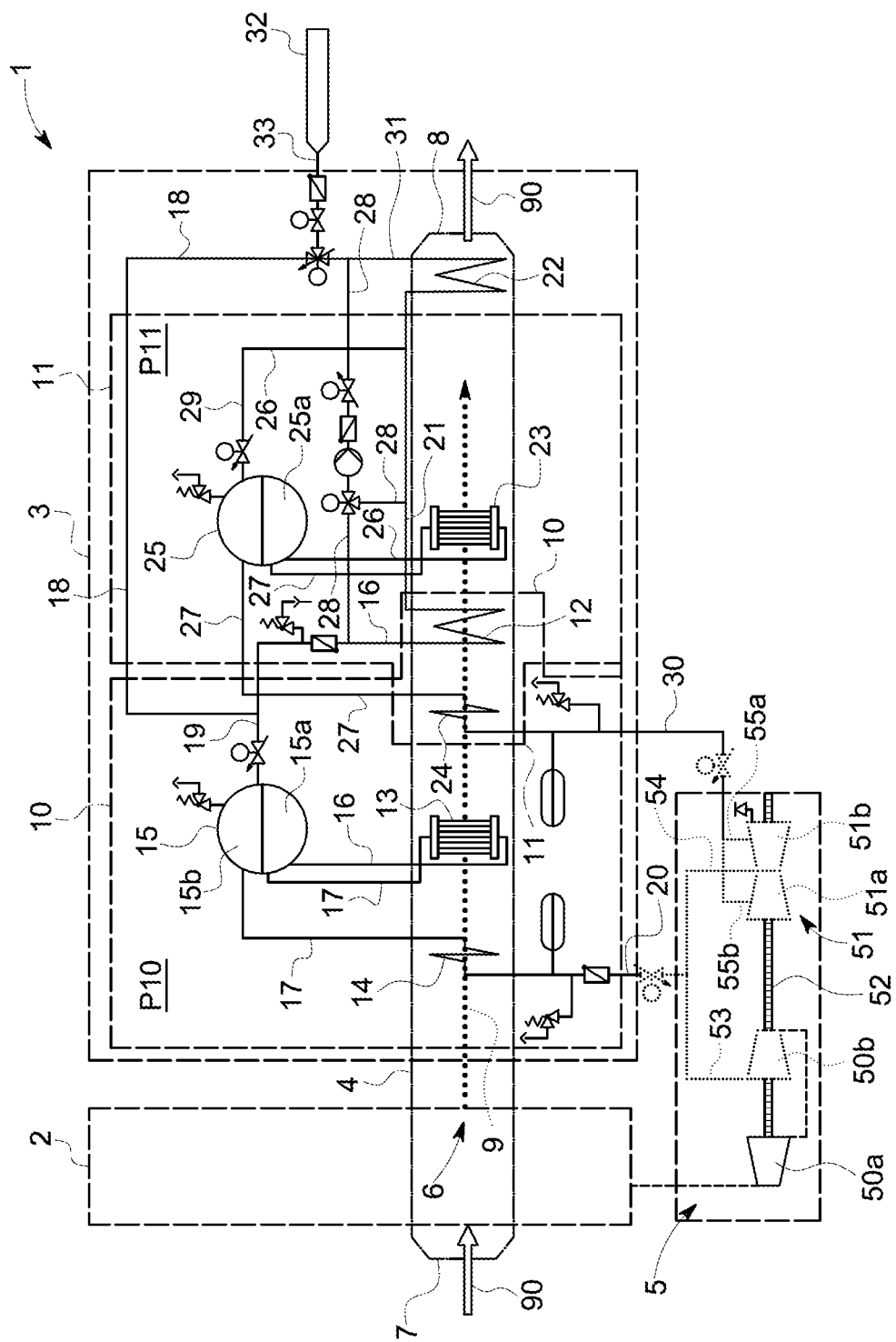

COMBINED CYCLE POWER PLANT AND METHOD FOR OPERATING SUCH A COMBINED CYCLE POWER PLANT

CROSS-REFERENCE TO RELATED APPLICATIONS

This application claims priority under 35 U.S.C. 119 to European Patent Application No. 16161150.4, filed on Mar. 18, 2016, which is incorporated herein by reference in its entirety.

BACKGROUND

The present disclosure relates to thermal power plants.

In combined cycle power plants (CCPP), commonly a fuel such as natural gas is burned in a gas turbine driving an electricity generator. Flue gases from the gas turbine are used for generating steam for driving a steam turbine (ST) and then again driving an electricity generator. The steam turbines require a water/steam cycle for generating the steam before it enters the steam turbine and cooling down the steam leaving the steam turbine until it condensates in order to then re-enter the cycle. CCPPs according to the prior art comprise water/steam cycles leading typically to gas turbine flue gas stack temperatures of ca. 80 to 85° C. which is the temperature with which the flue gas from the gas turbine finally enters a stack or chimney after heat from the flue gas has been used for heating condensate and generating steam therefrom in the water/steam cycle.

For steam generation, CCPPs according to the prior art comprise heat recovery steam generators (HRSG) usually having three evaporators that can be designed as once through or drum type. At the cold end of the HRSG, the condensate enters a first economizer commonly also called the low temperature (LT) economizer in order to be heated. Since the temperature of the condensate might drop below the temperature of the water/acid dew-point in the flue gas at the respective pressure, an economizer recirculation is applied in order to prevent the water/acid from condensing and thus to avoid potential corrosion of the economizer due to condensation of water/acid from the flue gas. The condensate flow to be heated by the LT economizer is limited as it is defined by the sum of the flow through the three evaporators of the HRSG, which are commonly categorized as a high pressure (HP), an intermediate pressure (IP) and a low pressure (LP) evaporator.

A common practice for increasing the heat extraction from flue gas according to the prior art with the aim of increasing overall efficiency of the CCPP is to connect additional feed-water based "heat consumers". One example of such a feed-water heat based "heat consumer" according to the prior art is a so-called flashing steam system. In flashing steam systems according to the prior art, water from the LP economizer is flashed into a vessel in order to generate steam. Remaining condensate is recirculated to the HRSG. Saturated steam generated is then injected into respective injection ports of a LP ST.

BRIEF DESCRIPTION

The preferred non-limiting embodiment described herein provide a water/steam system for a CCPP which allows for an increase of an overall efficiency of the CCPP while at least partly avoiding the mentioned drawbacks regarding the size of the economizer and the power consumption of the water recirculation pumps; and a method for operating a water/steam system for a CCPP.

These and other objects are achieved by a water/steam system according to claim 1, a combined cycle power plant according to claim 12 and an operating method according to claim 13.

According to at least one non-limiting embodiment, a water/steam system for a combined cycle power plant is provided. The water/steam system comprises a heat recovery steam generator providing a flue gas stream path for extracting heat from a flue gas stream exhausted from a gas turbine. The heat recovery steam generator has a low pressure section including a low pressure evaporator arranged along the flue gas stream path for generating low pressure steam at a low pressure input level for a main steam input of a low pressure steam turbine. The low pressure section further includes a sub low pressure evaporator for generating sub low pressure steam at a sub low pressure level below the low pressure level.

In another non-limiting embodiment, a method of operating a water/steam system for a combined cycle power plant is provided. The method comprises operating a water/steam system for a combined cycle power plant wherein along a flue gas stream path of a heat recovery steam generator, heat is extracted from a flue gas stream exhausted by a gas turbine. In a low pressure section of the heat recovery steam generator, low pressure steam is generated by means of a low pressure evaporator in the flue gas stream path at a low pressure input level for a main steam input of a low pressure steam turbine. In the low pressure section, additionally sub low pressure steam at a sub low pressure level below the low pressure level is generated by means of a sub low pressure evaporator in the flue gas stream path.

These non-limiting embodiments advantageously enable more heat to be extracted from the flue gas stream at low temperature levels compared to heat recovery steam generators according to the prior art. A heat recovery steam generator according to the embodiments described herein uses the additional sub low pressure evaporator located in the flue gas stream path for extracting the heat, and the additional sub pressure level has a smaller operating pressure than low pressure steam sections of heat recovery steam generators according to the prior art. Accordingly, any overhead of heat available at the cold end of the HRSG may be used for steam generation. This overhead is due to that a feed-water heating demand at low pressure extracted by a conventional low pressure economiser of the HRSG is lower than the amount of low temperature heat available in the flue gas stream.

In addition, the non-limiting embodiments described herein have the advantage over the prior art that superheated steam may be generated on the sub low pressure level in order to be used in the low pressure steam turbine. In contrast to that, flashing steam systems according to the prior art were only able to provide saturated steam. Moreover, such flashing steam systems according to the prior art were arranged outside of the HRSG, whereas the embodiments described herein enable integration of sub low pressure steam generating facilities, such as the sub low pressure steam generator and/or a sub low pressure super-heater, into the HRSG.

With the water/steam system according to the embodiments described herein, overall performance of a CCPP can be improved. The performance varies according to the amount of heat available in the HRSG and the type of a low pressure steam turbine used. Generally, an efficiency increase from 0.13% pts. 0.17% pts. can be seen in the overall CCPP. Since the inventive water/steam system may be used with existing steam turbines, the efficiency increase may be reached at a reasonable cost because it is not obligatory to redesign the turbine.

For the sake of completeness, it should be noted that the heat recovery steam generator may also comprise a high pressure section and/or a medium pressure section for providing steam at a high and an intermediate pressure level for a high and intermediate pressure steam turbine, respectively. The high and intermediate pressure levels are above the low pressure level. Steam at these pressure levels is used to drive high and intermediate pressure steam turbines, respectively.

These further embodiments may be combined independently of each other as desired.

According to a further embodiment, the sub low pressure evaporator is arranged downstream of the low pressure evaporator along the flue gas stream path. Thereby, heat may be extracted from the flue gas stream at temperatures lower than those at the low pressure evaporator.

According to one embodiment, a second low pressure economiser of the low pressure section for pre-heating water to be evaporated in the sub low pressure evaporator is arranged downstream of the sub low pressure evaporator along the flue gas stream path. Thereby, at a last stage before the flue gas stream exits a cold end of the HRSG, heat maybe extracted from the flue gas stream at a temperature level even lower than that of the sub low pressure evaporator.

According to a further embodiment, the low pressure section includes a low pressure super-heater for superheating the low pressure steam and a sub low pressure super-heater for superheating the sub low pressure steam. The low pressure super-heater is commonly used to super-heat steam generated in the low pressure evaporator in order to then introduce that steam into the main steam input of the low pressure turbine at a respective main input temperature level for the steam turbine. By means of the sub low pressure super-heater, the sub low pressure steam may be heated essentially up to that main input temperature level.

According to another embodiment, a first low pressure economiser of the low pressure section for pre-heating water to be evaporated in the low pressure evaporator is arranged downstream of the sub low pressure super-heater along the flue gas stream path. In that way, the sub low pressure super-heater is arranged between the low pressure evaporator and the first low pressure economiser along the flue gas stream path. Thereby, heat in the flue gas stream available at temperature levels between those of the sub low pressure super-heater and the first low pressure economiser may be extracted.

According to embodiment, the first low pressure economiser is arranged upstream of the sub low pressure evaporator along the flue gas stream path. In other words, the sub low pressure evaporator is arranged between the first low pressure economiser and the second low pressure economiser along the stream path. This arrangement enables to extract a high amount of heat from the flue gas stream even after the first low pressure economiser. The overall extraction may be exergetically optimized since in general, a heat demand and/or temperature level of the sub low pressure evaporator is lower than that of the first low pressure economiser.

According to another embodiment, the low pressure evaporator and the sub low pressure evaporator are part of a low pressure subsection and a sub low pressure subsection of the low pressure section, respectively. In other words, the low pressure section may be divided into two subsections. These two subsections operate at a low pressure and a sub low pressure, respectively.

According to another embodiment, the low pressure subsection and the sub low pressure subsection are both equipped with at least one steam drum each connected to the low pressure evaporator and the sub low pressure evaporator, respectively. By equipping each of the subsections with a steam drum, water and steam flows in the subsections may be controlled with a certain degree of independency from each other. The sub low pressure subsection may be operated independently of a feed-water flow passing through higher pressure level sections of the HRSG, such as the high pressure section, the intermediate pressure section and the low pressure subsection.

According to another embodiment, a sub low pressure outlet of the sub low pressure subsection may be connected to an intermediate inlet of a low pressure steam turbine. The intermediate inlet may be designed as at least one steam injection port. Thereby, the sub low pressure steam may be introduced into the low pressure steam turbine at a pressure level which is lower than that at the main input of the turbine. Since there is a sub low pressure super-heater in the HRSG, steam generated may have a temperature value which is comparable to that of the low pressure steam at the main steam input. In some embodiments this helps in reducing the risk of droplet erosion within the steam turbine and in turn enables to use higher injection steam flow values than flashing steam systems according to the prior art.

In some embodiments, a bleed port of the low pressure steam turbine is used as the intermediate inlet. This configuration has the advantage that in a water/steam system according to the embodiments described herein, known designs of low pressure steam turbines may be used. Low pressure steam turbines may comprise a first bleed port, at least one intermediate bleed port, and a last bleed port. The first, the at least one intermediate, and the last bleed ports are arranged at different pressure levels of the low pressure steam turbine. Pressure decreases from the first to the last bleed port.

In some embodiments, the at least one intermediate bleed port is used for steam injection. A pressure level of the at least one intermediate bleed port normally corresponds to that of the sub low pressure subsection, whereas the last bleed port is located at a pressure level which is too low for achieving the desired performance increase. Nevertheless, use of the different bleed ports will depend on the desired integration of a heat extraction scheme of an HRSG according to the preferred non-limiting embodiments described herein. Using the bleed ports for steam injection gives a high flexibility in customising a water/steam system according to specific configurations of an individual CCPPs.

BRIEF DESCRIPTION OF THE DRAWINGS

FIG. 1 shows a simplified diagram of a water/steam system of a combined cycle power plant according to the preferred non-limiting embodiments described herein.

DETAILED DESCRIPTION

As shown in FIG. 1, a water/steam system 1 according at least one preferred non-limiting embodiment comprises a high and/or intermediate pressure section 2 of a heat recovery steam generator (HRSG) 4 and a steam turbine section 5. The HRSG 4 provides a flue gas stream path 6. The flue gas stream path 6 extends from a hot end 7 to a cold end 8 of the HRSG 4. A flue gas inlet stream 9i enters the HRSG 4 at the hot end 7. A flue gas outlet stream 9o exits the HRSG 4 at the cold end 8.

After entering the HRSG 4 at the hot end 7, the flue gas stream 9 is guided along the flue gas stream path 6 through the high/intermediate pressure section 2. The high/intermediate pressure section 2 is equipped with high and/or intermediate pressure economisers, evaporators and/or super-heaters operating at respective high and/or intermediate pressure levels as known from HRSGs in order to generate steam for high and/or intermediate pressure steam turbines (not shown).

When exiting the high/intermediate pressure section 2, the flue gas stream 9 is guided through the low pressure section 3 along the flue gas stream path 6. The low pressure section 3 comprises a low pressure subsection 10 and a sub low pressure subsection 11. The low pressure subsection 10 is arranged upstream of the sub low pressure subsection 11 along the stream path 6, although the low pressure subsection 10 and the sub low pressure subsection 11 may interleave with each other which will become evident from the detailed description of the low pressure subsection 10 and the sub low pressure subsection 11 in the following.

The low pressure subsection 10 comprises a first low pressure economiser 12, a low pressure evaporator 13, and a low pressure super-heater 14. The first low pressure economiser 12 is arranged downstream of the low pressure evaporator 13 which is again arranged downstream of the low pressure super-heater 14 along the flue gas stream path 6. Additionally, the low pressure subsection 10 comprises a second low pressure economiser 22 arranged downstream of the low pressure subsection 11 in the flue gas stream path 6. By the arrangement of the second low pressure economiser 22 downstream of the sub low pressure subsection 11, the low pressure subsection 10 and the sub low pressure subsection 11 may be regarded as interleaving with each other.

Furthermore, a low pressure steam drum 15 is provided in the low pressure subsection 10. The low pressure steam drum 15 is connected on its waterside 15a to the first low pressure economiser 12 and the low pressure evaporator 13 through the respective low pressure water lines 16. A steam side 15b of the low pressure steam drum 15 is connected to the low pressure evaporator 13 and the low pressure super-heater 14 via respective low pressure steam lines 17.

On the waterside 15a, both the low pressure water line 16 and a bypass line 18 yield into a low pressure main water input 19 of the low pressure sub section 10, in particular the low pressure steam drum 15 thereof. Via the bypass line 18, both the first and the second economiser 12, 22 may be bypassed. On the steam side 15b, a low pressure super-heater steam output 20 of the low pressure subsection 10, in particular the low pressure super-heater 14 thereof, is connected to the steam turbine section 5 in order to provide steam to the steam turbine section 5 at a low pressure level $p_{10}$. Furthermore, feed water can enter the first low pressure economiser 12 directly through a first low pressure economiser water input line 21 connected to the input of the first low pressure economiser 12.

The sub low pressure subsection 11 comprises a sub low pressure evaporator 23, and a sub low pressure super-heater 24. Water pre-heated in the second low pressure economiser 22 may be used in the sub low pressure subsection 11 as well as in the high/intermediate pressure section 2. Therefore, the second low pressure economiser 22 may be regarded as being part both of the low pressure subsection 10 and the sub low pressure subsection 11. From another point of view, the first and second low pressure economizers 12, 22 may be regarded as a single economizer which is split by the sub low pressure evaporator 23 according to the embodiments described herein. Hence, this is another example for how the low pressure subsection 10 and the sub low pressure subsection 11 interleave with each other.

The second low pressure economiser 22 is arranged downstream of the sub low pressure evaporator 23 which is again arranged downstream of the first low pressure economizer 12 and the sub low pressure super-heater 24 along the flue gas stream path 6. Hence, the low pressure subsection 10 and the sub low pressure subsection 11 also interleave with each other in that the first low pressure economizer 12 is arranged between the low pressure super-heater 24 and the sub low pressure evaporator 23 along the flue gas stream path 6.

Furthermore, a sub low pressure steam drum 25 is provided. The sub low pressure steam drum 25 is connected on its waterside 25a to the second low pressure economiser 22 and the sub low pressure evaporator 23 through the respective sub low pressure water lines 26. A steam side 25b of the sub low pressure steam drum 25 is connected to the low pressure evaporator 23 and the sub low pressure super-heater 24 via respective sub low pressure steam lines 27.

On the waterside 25a, a recirculation lines 28 enable to recirculate water/condensate from the low pressure water line 16 and the first low pressure economiser water input line 21. The low pressure water line 16 may be regarded as a hot source line as it carries water from the first low pressure economizer 12 to the low pressure steam drum 15 on a higher temperature level than the water in the first low pressure economizer input line 21. Therefore, the first low pressure economizer input line 21 may be regarded as a cold source line.

Furthermore, the low pressure section 3 comprises a sub low pressure main water input 29 of the low pressure sub section 11, in particular the sub low pressure steam drum 25 thereof. On the steam side 25b, a sub low pressure steam super-heater output 30 of the sub low pressure subsection 11, in particular the sub low pressure super-heater 24 thereof, is connected to the steam turbine section 5 in order to provide steam to the steam turbine section 5 at a sub low pressure level $p_{11}$. Furthermore, feed water can enter the second low pressure economiser 22 directly through a water/condensate input line 31 connected to the input of the second low pressure economiser 22.

Via the water/condensate input line 31, water/condensate maybe provided to the entire HRSG 4 from a water/condensate source 32, such as a cooling facility like a water cooling tower or alike. The water/condensate source 32 is connected to the entire low pressure section 3 of the HRSG 4 via a water/condensate input 33 of the low pressure section 3. The water/condensate input 33 is split into the sub low pressure bypass line 18 and the second low pressure economiser water input line 31.

The steam turbine section 5 comprises high/intermediate pressure steam turbines 50a, 50b and a low pressure steam turbine 51 which are all arranged on a shaft 52 mechanically connected to an electricity generator (not shown). In a known manner, the high pressure steam turbine 50a is supplied with steam from the high/intermediate pressure section 2. Exhaust steam from the high pressure steam turbine 50a is used in the intermediate pressure steam turbine 50b (more specifically, the exhaust steam generally goes to an HRSG to be reheated, merges with incoming intermediate pressure steam and then goes to the intermediate pressure steam turbine).

The low pressure super-heater steam output 20 of the HRSG 4 and an exhaust steam line 53 connected to an exhaust steam output of the intermediate pressure steam turbine 50b both lead into a main input 54 of the low pressure steam turbine 51. The sub low pressure super-heater steam output 30 of the HRSG 4 is connected to intermediate ports 55a, 55b of the low pressure steam turbine 51, in particular to a first intermediate port 55a and a second intermediate port 55b of the low pressure steam turbine 51.

The low pressure steam turbine 51 is in general a double-flow steam turbine and in general comprises a first flow path and a second flow path 51a, 51b (left and right flow path) which are arranged mirror-symmetrically to each other. Each of the flow paths 51a, 51b may comprise three intermediate ports for example, associated to different pressure levels of the low pressure steam turbine 51. These low pressure levels may again comprise a high, an intermediate, and a low pressure level in the low and a sub low pressure level range. The first and second intermediate ports 55a, 55b are associated to a high and an intermediate pressure level of the low pressure steam turbine 51. In the alternative, the first and second intermediate ports 55a, 55b may be associated to that same pressure level of the low pressure turbine, e.g. the intermediate pressure level of the low pressure range. Bleed ports of the low pressure steam turbine 51 may be used as the intermediate ports 55a, 55b. Hence, the sub low pressure steam may be used at different sub low pressure levels $p_{11}$ in order to drive the low pressure steam turbine 51.

In operation, low pressure water/condensate enters the heat recovery steam generator 4 through the water input 33 from the water/condensate source 32 at a temperature between approx. 20° C. to 50° C. depending on the respective conditions. In the sub low pressure steam drum 25, temperatures of around 115° C. may prevail. Low pressure levels $p_{10}$ and the low pressure super-heater steam output line 20 commonly vary in a range from 4 to 8 bar. Based on this range, sub low pressure levels $p_{11}$ in the sub low pressure super-heater output line 30 are below 4 bar to vacuum.

For example, such a sub low pressure level $p_{11}$ may range between 0.8 and 1 bar. At a low pressure level $p_{11}$ of 0.9 bar, the respective steam would be superheated by 15 K. The mass flow of steam through the sub low pressure super-heater steam output line 30 would be up to approximately 4% of the mass flow of the steam flowing through the main input 54 of the low pressure steam turbine 51.

The sub low pressure subsection 11 may be at least partly switched off in time periods with extraordinarily low ambient temperatures around the CCPP and/or very low loads of the CCPP, i.e. that electricity consumption demanded to be covered by the CCPP is far lower than the power the CCPP is designed to provide at full load. In this way, heat available in the HRSG 7 can be shifted to the economisers 12, 22, so that water/condensate provided to the low pressure section 10 and the high/intermediate pressure section 2 can be sufficiently pre-heated.

What we claim is:

1. A water/steam system for a combined cycle power plant, comprising:
    a heat recovery steam generator providing a flue gas stream path for extracting heat from a flue gas stream exhausted from a gas turbine;
    wherein the heat recovery steam generator comprises:
    a high pressure section arranged along the flue gas stream path for generating high pressure steam at a high pressure input level for a high pressure steam turbine;
    an intermediate pressure section arranged along the flue gas stream path for generating intermediate pressure steam at an intermediate pressure input level for an intermediate pressure steam turbine, wherein the intermediate pressure inlet level is less than the high pressure input level;
    a low pressure section comprising a low pressure subsection and a sub low pressure subsection, the low pressure subsection including a low pressure evaporator arranged along the flue gas stream path for generating low pressure steam at a low pressure input level for a main input of a low pressure steam turbine, wherein the low pressure input level is less than the intermediate pressure input level;
    wherein the sub low pressure subsection further comprises a sub low pressure evaporator for generating sub low pressure steam at a sub low pressure level below the low pressure input level,
    wherein the low pressure subsection comprises a low pressure super-heater for superheating the low pressure steam, and the sub low pressure subsection comprises a sub low pressure super-heater for super-heating the sub low pressure steam,
    wherein the sub low pressure super-heater is arranged downstream of the low pressure evaporator along the flue gas stream path, and
    wherein the low pressure section also includes:
    an input line configured to provide a water and/or condensate to the sub low pressure subsection,
    a bypass line connected to the input line and configured to bypass the sub low pressure subsection, wherein the bypass line is a continuous conduit, and
    a recirculation line connected to the input line and the bypass line and configured to recirculate the water and/or condensate from the low pressure section.

2. The water/steam system according to claim 1, wherein the sub low pressure evaporator is arranged downstream of the low pressure evaporator along the flue gas stream path.

3. The water/steam system according to claim 1, wherein a first low pressure economiser of the low pressure section for pre-heating water to be evaporated in the low pressure evaporator is arranged downstream of the sub low pressure super-heater along the flue gas stream path.

4. The water/steam system according to claim 3, wherein a second low pressure economiser of the low pressure section for pre-heating water to be evaporated in the sub low pressure evaporator is arranged downstream of the sub low pressure evaporator along the flue gas stream path.

5. The water/steam system according to claim 4, wherein the first low pressure economiser is arranged upstream of the sub low pressure evaporator along the flue gas stream path.

6. The water/steam system according to claim 4, wherein the low pressure subsection and the sub low pressure subsection are both equipped with at least one steam drum each connected to the low pressure evaporator and the sub low pressure evaporator, respectively, and
    wherein the at least one steam drum is fluidly connected to both the low pressure evaporator and the first low pressure economiser via one or more water lines.

7. The water/steam system according to claim 6, wherein a sub low pressure super-heater outlet of the sub low pressure subsection is connected to an intermediate port of the low pressure steam turbine, and
    wherein the at least one steam drum is fluidly connected to at least one steam line.

8. The water/steam system according to claim 7, wherein a bleed port of the low pressure steam turbine is used as the intermediate inlet.

9. The water/steam system according to claim 8, wherein the low pressure steam turbine has a first bleed port, at least one middle bleed port and a last bleed port, wherein the at least one middle bleed port is used as the intermediate inlet.

10. The water/steam system according to claim 1, wherein the sub low pressure subsection is configured to be at least partially switched off while the heat recovery steam generator is in operation.

11. A combined cycle power plant comprising at least one water/steam system according to claim 1.

12. A method of operating a water/steam system for a combined cycle power plant comprising:
along a flue gas stream path of a heat recovery steam generator, extracting heat from a flue gas stream exhausted by a gas turbine;
in a high pressure section of the heat recovery steam generator, generating high pressure steam at a high pressure input level for a high pressure steam turbine;
in an intermediate pressure section of the heat recovery steam generator, generating intermediate pressure steam at an intermediate pressure input level for an intermediate pressure steam turbine, the intermediate pressure input level being lower than the high pressure input level;
in a low pressure subsection of the heat recovery steam generator, generating low pressure steam via a low pressure evaporator in the flue gas stream path at a low pressure input level (p10) for a main input of a low pressure steam turbine;
in a sub low pressure subsection of the heat recovery steam generator, generating additional sub low pressure steam at a sub low pressure level (p11) below the low pressure input level (p10) via a sub low pressure evaporator in the flue gas stream path,
in the sub low pressure subsection of the heat recovery steam generator, generating sub low pressure super-heated steam at a sub low pressure super-heater, the sub low pressure super-heater arranged downstream of the low pressure evaporator along the flue gas stream path, and
providing, via an input line, a water and/or condensate to the sub low pressure subsection,
bypassing a flow of water and/or condensate from the sub low pressure subsection, via a bypass line connected to the input line, wherein the bypass line is a continuous coduit, and
recirculating the water and/or condensate to the low pressure subsection via a recirculation line connected to the input line and the bypass line.

13. The method of operating a water/steam system according to claim 12, further comprising injecting the sub low pressure steam into an intermediate port of a low pressure steam turbine.

14. The method of operating a water/steam system according to claim 13, further comprising super-heating the sub low pressure steam to essentially a temperature level of the low pressure steam at a main input of the low pressure steam turbine.

15. A water/steam system for a combined cycle power plant, comprising:
a heat recovery steam generator providing a flue gas stream path for extracting heat from a flue gas stream exhausted from a gas turbine;
wherein the heat recovery steam generator comprises a high pressure section, an intermediate pressure section, and a low pressure section, the low pressure section comprising a low pressure subsection and a sub low pressure subsection, the low pressure subsection including a low pressure evaporator arranged along the flue gas stream path for generating low pressure steam at a low pressure input level for a main input of a low pressure steam turbine;
wherein the sub low pressure subsection further comprises a sub low pressure evaporator for generating sub low pressure steam at a sub low pressure level below the low pressure input level,
wherein the sub low pressure subsection comprises a sub low pressure super-heater for super-heating the sub low pressure steam,
wherein the sub low pressure super-heater is arranged downstream of the low pressure evaporator along the flue gas stream path, and
wherein the low pressure section also includes:
an input line configured to provide a water and/or condensate to the sub low pressure subsection,
a bypass line connected to the input line and configured to bypass the sub low pressure subsection, wherein the bypass line is a continuous conduit, and
a recirculation line connected to the input line and the bypass line and configured to recirculate the water and/or condensate from the low pressure section.

16. The system of claim 15, wherein the low pressure subsection and the sub low pressure subsection are interleaved.

17. The system of claim 15 further comprising:
a low pressure steam drum disposed in the low pressure subsection, the low pressure steam drum comprising a waterside and a steam side, the waterside further comprising:
at least one bypass line; and
at least one low pressure main water input;
the steam side further comprising:
at least one low pressure super-heater steam output;
the system further comprising:
a first low pressure economiser, the first low pressure economiser comprising a first low pressure economiser water input line.

18. The system of claim 17 further comprising:
a sub low pressure steam drum disposed in the sub low pressure subsection, the sub low pressure steam drum comprising a sub low pressure steam drum waterside and a sub low pressure steam drum steam side, the sub low pressure steam drum waterside further comprising:
at least one sub low pressure water line; and
at least one recirculation line, the at least one recirculation line configured to recirculate at least one of water and condensate from at least one of the low pressure water line and the first low pressure economiser water input line;
the sub low pressure steam drum steam side further comprising:
at least one sub low pressure super-heater steam line.

19. The system of claim 17, further comprising:
a second low pressure economiser disposed downstream of the sub low pressure evaporator along the flue gas stream path, the second low pressure economiser comprising at least one water/condensate input line fluidly connected thereto.

20. The system of claim 15, wherein water entering the heat recovery steam generator is in a temperature range from 20° C. to 50° C.,
   wherein the low pressure input level is between 4 bars and 8 bars, and
   wherein the sub low pressure level is between 0 bars and 4 bars.

* * * * *